Dec. 10, 1940.   R. F. JOHNSON ET AL   2,224,601

PIE PAN

Filed March 28, 1940

Rufus F. Johnson &
George Holtzman,
INVENTORS

BY W. B. Harpman
ATTORNEY

Patented Dec. 10, 1940

2,224,601

UNITED STATES PATENT OFFICE 2,224,601

PIE PAN

Rufus F. Johnson, Lowellville, and George Holtzman, Poland, Ohio

Application March 28, 1940, Serial No. 326,414

2 Claims. (Cl. 53—6)

This invention relates to a pie pan and more particularly to a pie pan separated through its center.

The principal object of the invention is the provision of a pie pan formed with two halves hinged together at one end thereof so as to form a pie pan which may in effect be split open and slid out from under a pie.

A further object of the invention is the provision of means for holding the two halves of the pie tin adjacent to each other when the parts are in closed position.

A still further object of the invention is the provision of a hinge that will hold the two parts of the pie pan on the same plane when they are opened and closed.

A further object of the invention is the provision of a pie pan provided with means for holding the two halves thereof adjacent to each other and at the same time forming a convenient handle which may be used in moving the pie pan and its contents in a hot oven. The pie pan shown and described herein represents an improvement over that shown and described in our patent application, Serial Number 123,000 filed January 29, 1937.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein.

Figure 1:
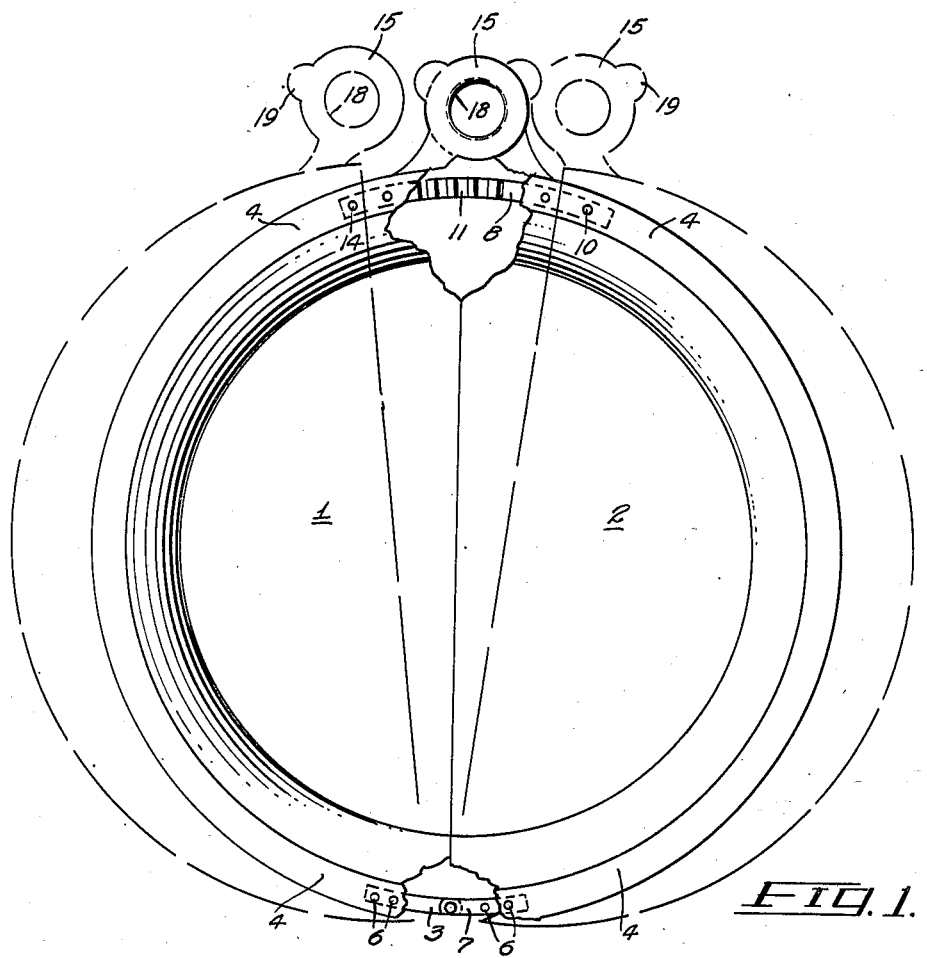
Figure 1 is a top plan view of the pie pan with parts broken away showing the hinge and the fastening means. The broken lines in the figure indicate the position of the pan when partly open.

By referring to the drawing it will be seen that a pie pan has been provided which is formed of two parts 1 and 2. These two parts are held together in a hinged manner by means of a hinge 3 which is positioned under an annular exterior flange 4 of the pie pan.

Figure 2:
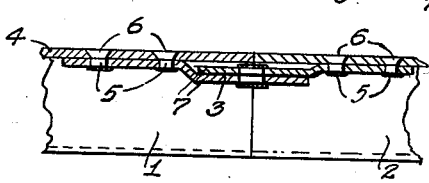
Figure 2 is an enlarged detailed view in cross section showing the hinge and its fastening means on the pan.

By referring to Figure 2 it will be seen that this hinge 3 is held in position underneath this flange 4 by means of rivets 5 having countersunk heads 6 so that the outer edge of the pie crust will not be interfered with in the process of removing the pie from the pan when the baking has been completed. It will also be seen that the hinge 3 is provided with downwardly extending portions 7 which properly position the hinge 3 beneath the annular exterior flange 4.

Figure 3:
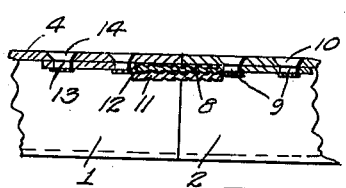
Figure 3 is an enlarged detailed view in cross section showing the fastening means and means of securing the same to the pan.

By referring to Figure 3 it will be seen that there is provided means for securing the pan parts 1 and 2 when in closed position comprising a corrugated tongue 8 secured underneath the exterior rim 4 by means of rivets 9. The said rivets 9 are positioned with countersunk heads 10 so that the upper surface of the flange 4 presents a smooth surface. It will also be seen that there is provided a corrugated fastening member 11 provided with a downwardly extended portion 12 in order to provide a separation between the under portion of the exterior flange 4 and the corrugated fastening member 11. It will be readily seen that the corrugated tongue 8 is forced inwardly between the underside of the exterior rim 4 and the corrugated fastening member 11. The corrugations of the tongue 8 register with the corrugations on the upper surface of the corrugated fastening member 11 thereby providing a convenient and secure means of holding the parts 1 and 2 in closed position in order to hold the pie securely during the baking process. It will also be seen that the corrugated fastening member 11 is securely fastened underneath the exterior rim 4 by means of rivets 13 having their heads 14 countersunk in order to provide a smooth surface on the upper face of the exterior rim 4.

Figure 4:
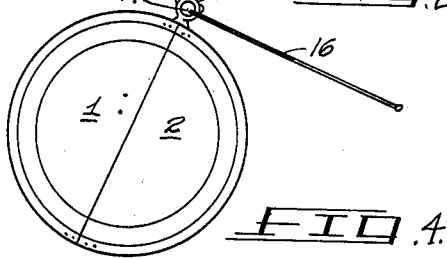
Figure 4 is a top plan view of the pan in closed position used to turn the pan upon its bottom when in an oven.

By referring to Figures 1, 3 and 4 it will be seen that there is provided a pair of handle members 15 secured to the exterior rim 4 in order to provide means for opening the parts 1 and 2 of the pie pan and to form a secondary catch to insure the positive closure of the halves of the pie pan. It will be seen that one of the handle members 15 is provided with a downturned flange 18 which is adapted to seat within the opening in the other handle member 15 in the manner of a snap. In order that these handle portions may be separated a tongue 19 is provided on each of the handle members so that the same may be disengaged from their closed position and used as convenient handles in opening the pie tin.

By referring to Figure 4 it will be seen that a convenient arm 16 having a hook end 17 formed thereon may be used in connection with the openings in the handle members for effectively moving or removing the pan from the oven.

What we claim is:

1. In a device of the class described, comprising a pie pan separated into two parts, hinge means secured underneath an exterior flange of the said device for securing said parts in hinged relation to each other, fastening means comprising a pair of handles, both of which are provided with centrally positioned openings and one of which is provided with a short annular flange formed about the said opening therein, the said flange adapted to seat within the centrally positioned opening of the other handle member.

2. In a device of the class described, comprising a pie pan separated into two parts, hinge means secured underneath an exterior flange of the said device for securing said parts in hinged relation to each other, fastening means comprising a pair of handles, both of which are provided with centrally positioned openings and one of which is provided with a short annular flange formed about the said opening therein, the said flange adapted to seat within the centrally positioned opening of the other handle member together with a secondary fastening means comprising a corrugated tongue and a corrugated fastening member spaced apart underneath the said exterior flange for the purpose of holding the device in closed position.

RUFUS S. JOHNSON.
GEORGE HOLTZMAN.